United States Patent
Sgherri et al.

(10) Patent No.: US 9,180,733 B2
(45) Date of Patent: Nov. 10, 2015

(54) VARIABLE-DIAMETER WHEEL

(75) Inventors: Guido Roberto Sgherri, La Spezia (IT); Giovanni La Spina, La Spezia (IT)

(73) Assignee: OTO MELARA S.P.A., La Spezia (IT)

( * ) Notice: Subject to any disclaimer, the term of this patent is extended or adjusted under 35 U.S.C. 154(b) by 677 days.

(21) Appl. No.: 13/276,936

(22) Filed: Oct. 19, 2011

(65) Prior Publication Data

US 2012/0104834 A1 May 3, 2012

(30) Foreign Application Priority Data

Oct. 20, 2010 (IT) ................. TO2010A0847

(51) Int. Cl.
*B60B 15/14* (2006.01)
*B60B 15/18* (2006.01)
*B60B 19/04* (2006.01)

(52) U.S. Cl.
CPC ............... *B60B 15/14* (2013.01); *B60B 15/18* (2013.01); *B60B 19/04* (2013.01); *B60B 2900/551* (2013.01); *B60Y 2200/20* (2013.01); *B60Y 2200/24* (2013.01)

(58) Field of Classification Search
CPC ........ B60B 15/10; B60B 15/16; B60B 15/18; B60B 15/20; B60B 15/22; B60B 15/26; B60B 19/04; B60B 15/14
USPC ............. 301/5.1, 38.1, 39.1, 40.1, 40.6, 41.1, 301/43, 44.1, 44.3, 44.4, 45, 46, 47, 48, 50, 301/51, 53, 91; 305/1, 2, 3, 4, 5; 180/8.1, 180/8.2, 8.3; 280/5.2, 5.26, 5.3, DIG. 10
See application file for complete search history.

(56) References Cited

U.S. PATENT DOCUMENTS

| | | | | |
|---|---|---|---|---|
| 801,569 A | * | 10/1905 | Clark | ................ 301/46 |
| 1,450,626 A | | 4/1923 | Atwood | |
| 2,250,713 A | | 7/1941 | Johnson | |
| 3,802,743 A | * | 4/1974 | Hermanns | ...................... 301/5.1 |
| 2010/0141018 A1 | | 6/2010 | McCue | |

FOREIGN PATENT DOCUMENTS

| | | | |
|---|---|---|---|
| CH | 168599 A | * | 4/1934 |
| FR | 603 857 | | 4/1926 |
| FR | 2 220 392 | | 10/1974 |
| JP | 63-121502 | * | 5/1988 |
| WO | WO 2010/087542 | | 8/2010 |

OTHER PUBLICATIONS

Italian Search Report for Application No. TO20100847 mailed Jun. 10, 2011.

* cited by examiner

*Primary Examiner* — Kip T Kotter
*Assistant Examiner* — Jean Charleston
(74) *Attorney, Agent, or Firm* — Merchant & Gould P.C.

(57) ABSTRACT

A variable-diameter wheel 1 includes at least one rim or hub 11 having a predetermined diameter, to which at least one drive axle 14 of the wheel 1 is connected; at least one outer surface external to the hub 11, having a diameter which is greater than the diameter of the hub 11. At least one diameter-variation mechanism 3 is secured to the axle 14 and adapted to vary the actual diameter of the wheel 1 according to the torque applied to the drive axle 14 by at least one propulsion system.

8 Claims, 3 Drawing Sheets

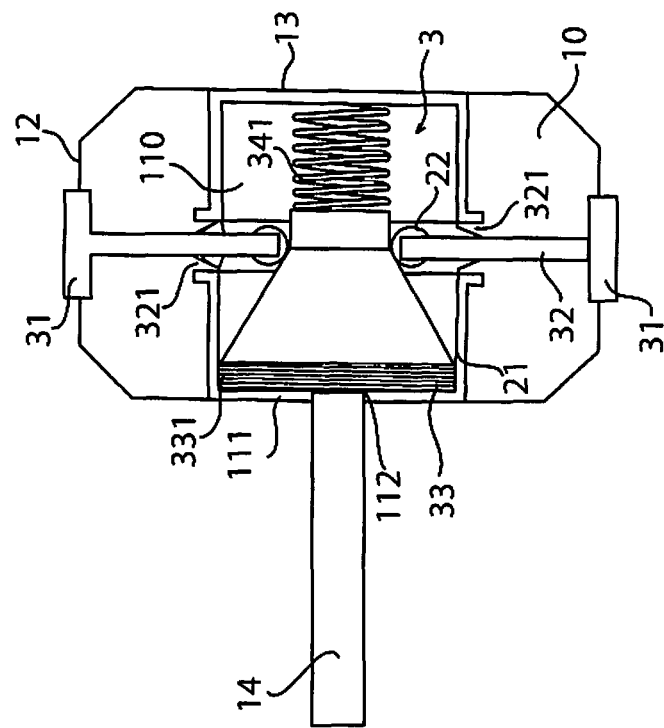
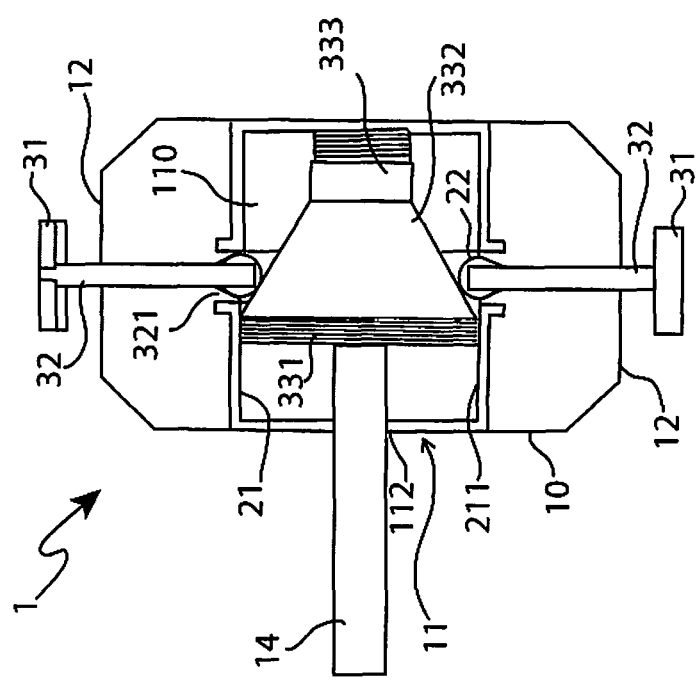

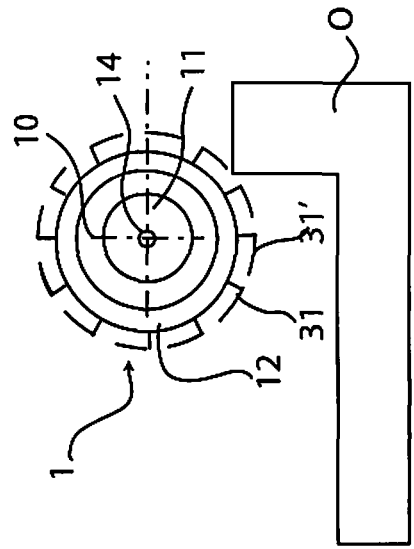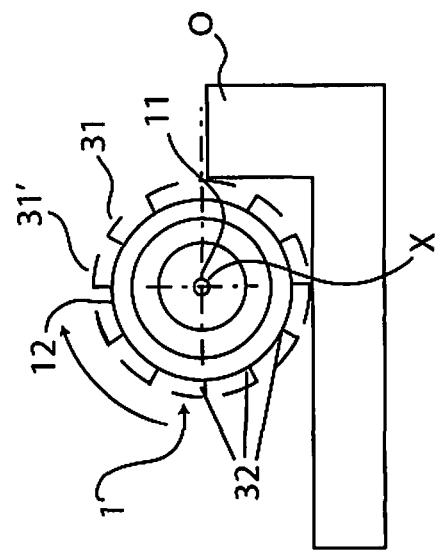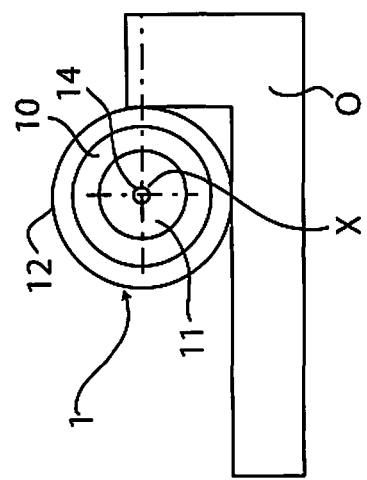

VARIABLE-DIAMETER WHEEL

This application claims benefit of Serial No. TO 2010 A 000847, filed 20 Oct. 2010 in Italy and which application is incorporated herein by reference. To the extent appropriate, a claim of priority is made to the above disclosed application.

BACKGROUND

The present invention relates to a wheel which comprises a passive mechanism adapted to vary its outer diameter according to the drive torque applied to said wheel.

The present invention is applicable, in particular, to vehicles or wheel-based mechanisms in general.

It is known that vehicles fitted with tire wheels and intended for off-road use or for use on uneven surfaces can be hindered by obstacles or rough terrain.

Normally such vehicles are equipped with an all-wheel-drive system, but for vehicles having many wheels, or when an all-wheel-drive system cannot be installed in a vehicle even if it does not have many wheels, this solution becomes unacceptable in terms of costs and technical complexity.

It is known that, for such wheeled vehicles, if an obstacle is higher than the wheel axis, that obstacle cannot be overcome because the wheel will stop against it.

It is therefore appropriate, for such vehicles, to adopt large-diameter wheels, so that most obstacles, like rocks or steps, can be overcome.

It is also known that medium and large-diameter wheels, such as, for example, those of armoured and/or amphibious vehicles, take up much space when stored and are difficult to handle, e.g. when they must be replaced, thus causing both logistic and operational problems.

It is also known that, in the field of robotized vehicles, vehicles are known which are suitable for detecting, defusing and deflagrating explosive devices and which are used in missions normally identified by the English acronyms EOD, IEDD and NBC.

In such types of missions it is necessary that the vehicle in use is as small and as easy to handle as possible, so that it can reach narrow and impervious places and make observations underneath other vehicles for the purpose of finding out any dangerous materials, e.g. explosive materials.

In most missions wherein they are employed, these robotized vehicles are forced to move within unstructured and often rough environments that include many obstacles.

Quite often, such obstacles cannot be overcome because the wheels of said vehicles have a small diameter and are easily prone to getting stuck, thereby causing the vehicle to stall.

SUMMARY

The present invention aims at solving the above-mentioned technical problems by providing a wheel which comprises a mechanism, preferably an automated one, for varying the outer diameter of said wheel, preferably drive wheels of vehicles or of wheel-based mechanisms. This mechanism allows such vehicles to overcome obstacles which are higher than the wheel axis when the wheel is in the idle condition.

Such a mechanism may also be used for varying the diameter of said wheel according to the applied torque. One aspect of the present invention relates to a wheel having a variable outer diameter.

BRIEF DESCRIPTION OF THE DRAWINGS

The features and advantages of said wheel will become more apparent from the following description of one embodiment thereof with reference to the annexed drawings, wherein:

FIG. 2 shows a front view of the cross-section of the wheel of FIG. 1 in the active configuration;

FIG. 3 shows a front view of the cross-section of the structure of the wheel according to the present invention, in the idle configuration;

FIGS. 4A, 4B and 4C illustrate the behaviour of said wheel when an obstacle higher than the wheel axis is encountered along the path.

DETAILED DESCRIPTION

Figure 1:
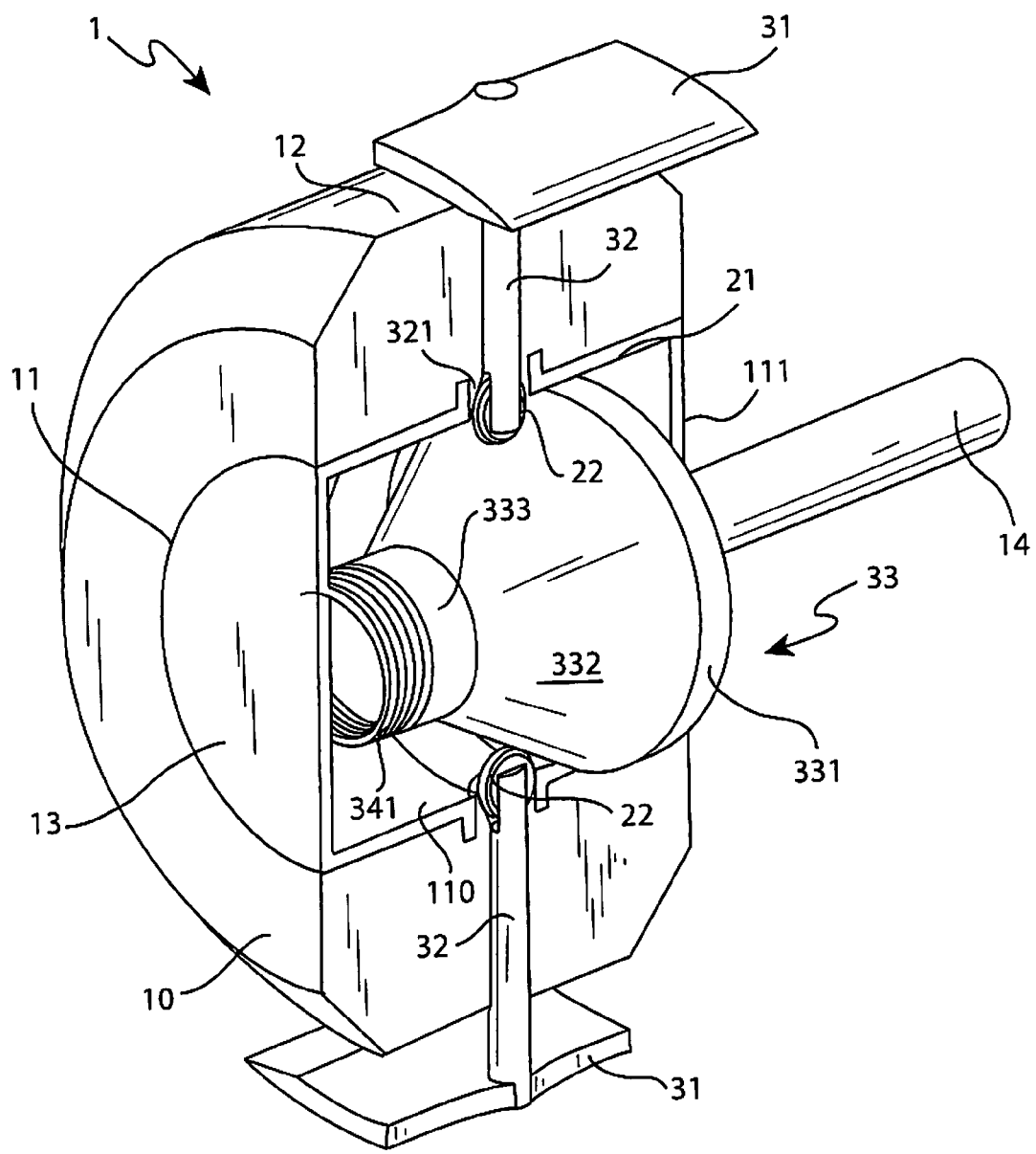
FIG. 1 shows a perspective sectional view of the wheel according to the present invention.

With reference to the above-mentioned drawings, wheel 1 with a variable outer diameter comprises at least one rim or hub 11 with a predefined diameter, to which at least one drive axle 14 of wheel 1 is connected; at least one surface external to hub 11, having a greater diameter than said hub 11.

Said wheel 1 comprises at least one diameter variation mechanism 3, secured to said axle 14 and adapted to vary the actual diameter of said wheel 1 according to the torque applied to drive axle 14 by at least one propulsion system.

Said diameter variation mechanism 3 can take at least two operating configurations:

an idle configuration, in which mechanism 3 is substantially incorporated within the outer diameter of the outer surface of wheel 1.

an active configuration, in which mechanism 3 increases the actual diameter of wheel 1 by bringing at least a portion of same mechanism 3 beyond the outer diameter of the surface of wheel 1.

For the purposes of the present invention, "substantially incorporated" means that there are no parts of the mechanism protruding from the outer diameter of the wheel and affecting the behaviour thereof as it rotates.

In one embodiment, said wheel 1 is applied to a vehicle, and the outer diameter of the outer surface of said wheel 1 is defined by at least one tread 12 of at least one tire 10 mounted on hub 11.

In said embodiment, the variation of the torque applied to axle 14 of wheel 1 due, for example, to wheel 1 being obstructed or blocked by an obstacle "O" brings the diameter variation mechanism 3 into the active operating configuration.

Said diameter variation mechanism 3 comprises:

one or more contact portions 31, adapted to come in contact with the ground where the vehicle is placed by protruding from the diameter of tread 12 of tire 10 when mechanism 3 switches to the active operating configuration;

one or more sliding rods 32, preferably having a circular cross-section, adapted to slide radially from wheel 1 and connected to as many contact portions 31.

at least one actuation device 33, preferably comprised inside hub 11 and connected to an axle 14 of the wheel 1; said device 33 is adapted to slide said rods 32 by acting upon one or more kinematic devices 22, each connected to at least one rod 32.

at least one control element adapted to control the actuation of said diameter variation mechanism 3 by allowing mechanism 3 to switch to the active configuration when the drive torque applied to axle 14 by the propulsion system exceeds a predefined limit threshold "T1"; said threshold "T1" is preferably set beforehand when adjusting mechanism 3 depending on the power of the propulsion system.

Rim 11 comprises a hollow structure 110 into which variation mechanism 3 is substantially incorporated. Said hollow 110 comprises at least one guide insert 21, which comprises at least one first threaded portion 211 and which is adapted to guide actuation device 33 as mechanism 3 switches between the different operating configurations.

As aforementioned, in the idle configuration contact portions 31 are at least partially incorporated within tire 10, in particular within tread 12.

Said contact portions 31 have preferably a rectangular shape, and their width is at most equal to the width of tread 12.

Furthermore, said contact portions have such an inclination as to generate a step with a following contact portion 31'. Said step can be seen by observing the wheel from the sides, as shown in FIGS. 4B and 4C, when mechanism 3 is in the active configuration.

The number of external portions 31, and therefore of rods 32, must be such that, when viewing the wheel from one side, a pseudocylindrical envelope of contact portions 31 is obtained.

The number of said external portions 31 is preferably at least 8.

Each rod 32 slides radially, thus crossing both hub 11 and tire 10, by exploiting the centrifugal or centripetal action caused by the change of the operating state of diameter-variation mechanism 3.

In order to allow rods 32 to come out, hub 11 comprises one aperture 321 for each rod 32.

The centrifugal motion of each rod 32 is countered by at least one elastic means (not shown), which prevents said rods 32 from sliding during the normal rotation of wheel 1, if the diameter-variation mechanism 3 has not been activated; furthermore, said elastic means is such that it brings sliding rods 32 back to their proper position when mechanism 3 switches to the idle configuration.

In the embodiment shown in FIGS. 1, 2 and 3, which are merely non-limiting descriptive drawings, wheel 1 comprises a tubeless solid tire 10 which comprises a more or less thick layer of tread 12.

In alternative embodiments, it is possible to implement a wheel 1 comprising at least one tube-type or tubeless tire which is nonetheless suitable for the application concerned.

The first threaded portion 211, whose thread follows the main direction of rotation of axle 14, can be coupled to a second threaded portion 331, comprised in the actuation device and following the main direction of rotation of axle 14.

Actuation device 33 is secured, preferably by keying, to axle 14.

Threaded portion 331 of actuation device 33 is substantially cylindrical, with a diameter equal to that of hollow structure 110 that comprises guide insert 21.

Actuation element 33 also comprises at least one tapered portion 332.

Said tapered portion 332 is preferably smooth and has, for example, a linear and constant inclination.

Said tapered portion 332 is acted upon by kinematic device 22, which is preferably a small-diameter wheel appropriately connected to sliding rod 32, e.g. through a fork.

Said kinematic device 22 is preferably directly in contact with actuation device 33.

In the embodiment described so far and shown in the drawings, the actuation device substantially has the shape of a truncated cone, with the major base secured to shaft 14 and the minor base facing the inside of hollow structure 110.

More in detail, such a motion of device 33 allows kinematic device 22 to move along the inclined plane of tapered portion 332, thus allowing rods 32 to slide radially and contact portions 31 to be raised or lowered with respect to the profile of tread 12.

The movement of the above-mentioned parts depends on the direction of axial movement of actuation device 3 and on the thread direction of the threaded portions (331 and 211).

In the embodiment shown in FIGS. 1, 2 and 3, the rising of contact portions 31 corresponds to a forward movement of actuation device 33 inside hollow portion 110, whose thread follows the main direction of rotation of drive axle 14 of wheel 1.

In the embodiment shown in FIGS. 1, 2 and 3, the actuation of mechanism 3 is controlled by the control element, which consists of an elastic element, preferably a coil spring 341, arranged between a fixing portion 333, comprised in the actuation device, and a thrust insert 13, comprised in rim 11 and delimiting hollow portion 110 on one side.

Said elastic element 33 compresses or extends as a function of the axial displacement of actuation device 33.

In the preferred embodiment, said elastic element has an elastic constant "k" such that it prevents device 33 from sliding axially until the drive torque acting upon axle 14 exceeds the predefined threshold "T1".

Said threshold "T1" substantially corresponds to a condition in which wheel 1 stops against an obstacle, which, as shown in FIG. 4A, is higher from the ground than the axis of wheel 1.

On the side opposite to thrust insert 13, hollow portion 110 is delimited by a sealing insert 111, which comprises a through hole 112.

Said through hole 112 allows axle 14 to enter hub 110 to connect to device 33.

Said hole 112 is such as to prevent any harmful or contaminating substances, e.g. dust and/or water, from entering hollow portion 110 and damaging the diameter-variation mechanism 3.

In addition to providing protection against aggressive and/or contaminating external agents, said sealing insert 111 also acts as a striker or end-of-travel element for the axial motion of actuation device 33.

The process through which said wheel 1 increases its diameter can be briefly illustrated by means of a list of sequential operating steps:
  a drive torque increase is detected, caused by wheel 1 getting stuck;
  actuation device 33 consequently slides along the first threaded portion 211 through the second threaded portion 331, thus making an axial movement, inside hollow structure 110;
  the elastic element between actuation device 33 and thrust insert 13 is compressed;
  kinematic device 22 slides along tapered portion 332 and rods 32 are raised;
  contact portions 31 come out of the tread profile, thus increasing the actual diameter of said wheel 1.
  obstacle "O" is overcome, resulting in a reduced drive torque acting upon axle 14, so that diameter-variation mechanism 3 returns to the idle operating configuration.

Once obstacle "O" has been overcome, the drive torque decreases and the thrust against the elastic element causes actuation device 33 to be unscrewed, thereby allowing diameter-variation mechanism 3 to return to the idle operating configuration.

The axial motion of actuation device 33 in the hollow structure of hub or rim 11 follows a direction along an axis "X" in agreement with the direction of drive axle 14.

The mechanism described so far and shown in the drawings is capable of activating itself in one direction of rotation of the drive torque only; should this capability be required in both directions, the vehicle could be equipped with a variable drive system wherein drive wheels 1 operating in one direction of travel are different from drive wheels 1 operating in the opposite direction of travel, e.g. a system capable of switching the drive from front to rear.

As an alternative to the proposed solution, it is possible to provide the vehicle with an all-wheel-drive system and to assemble diameter-variation mechanism 3 with opposite directions of actuation between front and rear, e.g. by using different threads, one left-handed and the other right-handed.

Said diameter-variation mechanism 3 is totally interchangeable in the event of failure or wear of parts thereof.

In an alternative embodiment, said variable-diameter wheel may also be used in technical fields other than the one described so far, such as, for example, devices and systems comprising wheelworks and benefiting from the presence of a wheel 1, e.g. a toothed wheel or a pulley, whose diameter is variable as a function of the torque applied to said wheel 1.

The invention claimed is:

1. Variable-diameter wheel comprising:
at least one rim or hub having a predefined diameter, to which at least one drive axle of the wheel is connected;
at least one outer surface, external to the hub, having an outer diameter greater than the predefined diameter of said hub;
the wheel is applied to a vehicle in which the outer diameter of the outer surface of said wheel is defined by at least one tread of at least one tire mounted on said hub;
the wheel comprises at least one diameter variation mechanism secured to said axle and adapted to vary an actual diameter of said wheel in response to variation in torque applied to the drive axle by at least one propulsion system;
the diameter variation mechanism is passive and can take at least two operating configurations:
an idle configuration, in which said diameter variation mechanism is substantially incorporated within the outer diameter of the outer surface of the wheel;
an active configuration, in which said diameter variation mechanism increases the actual diameter of the wheel by bringing at least a portion of said diameter variation mechanism beyond the outer diameter of the outer surface of the wheel;
wherein a variation in the torque applied to the axle due to the wheel being obstructed or blocked by an obstacle brings the diameter-variation mechanism into the active operating configuration.

2. The wheel according to claim 1, wherein said diameter-variation mechanism comprises:
one or more contact portions adapted to come in contact with the ground where the vehicle is placed by protruding from the diameter of the tread of the tire when the diameter-variation mechanism switches to the active operating configuration;
one or more sliding rods adapted to slide radially from the wheel, each connected to at least one contact portion;
at least one actuation device inside the hub and connected to the axle of the wheel, adapted to slide said rods by acting upon one or more kinematic devices, each connected to at least one rod;
at least one control element adapted to control the actuation of said diameter-variation mechanism by allowing said diameter-variation mechanism to switch to the active configuration when the drive torque applied to the axle by the propulsion system exceeds a predefined limit threshold.

3. The wheel according to claim 2, wherein the rim comprises at least one hollow structure into which the diameter-variation mechanism is substantially incorporated.

4. The wheel according to claim 3, wherein inside of said hollow structure at least one guide insert is included comprising at least one first threaded portion and which is adapted to guide the actuation device as the diameter-variation mechanism switches between the operating configurations.

5. The wheel according to claim 2, wherein said contact portions, which are at least partially incorporated within the tread of the tire, have a rectangular shape, and their width is at most equal to the width of the tread, with an inclination as to generate a step with a following contact portion.

6. The wheel according to claim 2, wherein:
the kinematic device is a second wheel with a diameter smaller than the diameter of the variable-diameter wheel connected to the sliding rod;
centrifugal motion of each sliding rod, which crosses both the hub and the tire, is countered by at least one elastic means, which prevents said rods from sliding during the normal rotation of the wheel.

7. The wheel according to claim 2, wherein said actuation device comprises:
a second threaded portion, which can be coupled to the first threaded portion through threads following the main direction of rotation of the rotary axle;
at least one tapered portion, which is acted upon by the kinematic device;
at least one fixing portion, to which the control element is connected.

8. The wheel according to claim 7, wherein said control element is an elastic element with an elastic constant defined according to the threshold and to the power of the propulsion system.

* * * * *